United States Patent [19]
Hackel et al.

[11] Patent Number: 5,612,538
[45] Date of Patent: Mar. 18, 1997

[54] FARADAY IMAGING AT HIGH TEMPERATURES

[75] Inventors: Lloyd A. Hackel, Livermore; Patrick Reichert, Hayward, both of Calif.

[73] Assignee: The Regents of the University of California, Oakland, Calif.

[21] Appl. No.: 373,994

[22] Filed: Jan. 17, 1995

[51] Int. Cl.$^6$ ..................................................... G01J 5/06
[52] U.S. Cl. ..................... 250/341.1; 250/341.2
[58] Field of Search ................. 250/341.1, 341.2, 250/341.6, 341.8, 339.01, 339.11, 330

[56] References Cited

U.S. PATENT DOCUMENTS

| | | | |
|---|---|---|---|
| 5,038,016 | 8/1991 | Robertson et al. | 219/121.83 |
| 5,202,741 | 4/1993 | Snyder | 356/4 |
| 5,286,947 | 2/1994 | Clyde et al. | 219/121.83 |

Primary Examiner—David P. Porta
Assistant Examiner—Richard Harris
Attorney, Agent, or Firm—Henry P. Sartorio; John P. Wooldridge

[57] ABSTRACT

A Faraday filter rejects background light from self-luminous thermal objects, but transmits laser light at the passband wavelength, thus providing an ultra-narrow optical bandpass filter. The filter preserves images so a camera looking through a Faraday filter at a hot target illuminated by a laser will not see the thermal radiation but will see the laser radiation. Faraday filters are useful for monitoring or inspecting the uranium separator chamber in an atomic vapor laser isotope separation process. Other uses include viewing welds, furnaces, plasma jets, combustion chambers, and other high temperature objects. These filters are can be produced at many discrete wavelengths. A Faraday filter consists of a pair of crossed polarizers on either side of a heated vapor cell mounted inside a solenoid.

27 Claims, 3 Drawing Sheets

FARADAY IMAGING AT HIGH TEMPERATURES

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the imaging of high temperature objects, and more specifically, it relates to the use of a Faraday filter to image high temperature objects.

2. Description of Related Art

Viewing of high temperature, self-luminous objects is difficult because the contrast is either too high (welding) or too low (blast furnace). Bandpass filters are used in optical systems in conjunction with laser light sources in order to exploit the narrow band properties of lasers. The filters selectively attenuate background ambient light, which is broadband, relative to the laser light.

The dielectric filter is commonly used in optical systems in conjunction with laser light sources because of its economy and effectiveness. However, the bandwidth of a dielectric filter is orders of magnitude wider than the line widths of most lasers, so the potential for spectral discrimination is not fully realized. Narrow band dielectric interference filters typically have bandwidths of 10 nm (FWHM) and peak transmissions of 50%. Narrower bandwidths are possible, but the filters become excessively sensitive to temperature and field of view, and peak transmission is reduced substantially. Integrated out-of-band transmission, or leakage, is suppressed by the use of absorbing glass cutoff filters packaged with the dielectric filter, and is generally several orders of magnitude less than integrated inband transmission.

Techniques and products using laser illumination and filters exist and are commercially sold. For example Control Vision Incorporated (841 Chamberlain Ave. Idaho Falls, Ida.) has a line of products using high peak power lasers as illuminators. However these systems use conventional narrow band filters which have a wide bandpass of typically 5 nm and need more expensive high power illuminators to overcome the background radiation. The much wider bandpass requires that the laser be pulsed and the detector gated. Both add significant cost and complication to the system. In U.S. Pat. No. 5,202,741, advantage was taken of the fact that basically only the object would reflect laser radiation and thus become detectable.

Faraday filters provide ultra-narrow optical bandwidths of the order of a few GHz with offband rejection of $10^5$ and throughput of 70%. They utilize the anomalous dispersion of an atomic absorption line in the presence of an axial magnetic field, and are therefore available at numerous discrete wavelengths throughout the optical spectrum. As shown in FIG. 1, a Faraday filter 2 using the cesium resonant line at 852 nm would consist of a pair of crossed polarizers 4 and 6 on either side of a vapor cell 8 heated to about 120° C. The vapor cell is mounted inside a solenoid 9 providing an axial magnetic field of around 100 gauss.

SUMMARY OF THE INVENTION

It is an object of the present invention to provide a method and apparatus using a Faraday filter for high temperature imaging.

This invention is a laser viewing system which can be attached to a laser processing system to allow viewing and subsequent adjusting of the input laser beam focus and power on surfaces being welded, heat treated and/or machined by a high power laser processing system. The system includes a high power processing laser system, a means for delivering the laser light such as a fiber optic cable or a set of articulated mirrors, a turning mirror which reflects the high power laser beam to the processing area and simultaneously allows transmission of the captured low power reflected illuminator laser light, a focusing lens which delivers the high power laser light and simultaneously captures the reflected light from a low power illuminator laser, a low power laser diode illuminator which illuminates the treated area, a Faraday optical filter and a non-intensified charge coupled device (CCD) video camera with focusing lens. The entire optical viewing system is sufficiently compact that it can be mounted on the apparatus holding the high power focusing lens and can easily move with the delivery system during the welding process. With this setup the area heated by the processing laser can be viewed with sufficiently good contrast to allow adjustment of focal length of the focusing lens and/or the input laser power to optimize the performance of the process.

The Faraday filter of the present invention rejects background light from self-luminous thermal objects, but transmits laser light at the passband wavelength of the filter, thus providing an ultra-narrow optical bandpass filter. The filter preserves images so a camera looking through a Faraday filter at a hot target illuminated by a laser will not see the thermal radiation but will see the laser radiation. Faraday filters are useful for monitoring or inspecting uranium separator chambers in an atomic vapor laser isotope separation process. Other uses include viewing welds, furnaces, plasma jets, combustion chambers, and other high temperature objects.

The method of imaging with a Faraday filter makes use of the anomalous dispersion of an atomic absorption line in the presence of an axial magnetic field. These filters can be produced at many discrete wavelengths. A Faraday filter used for imaging comprises a pair of crossed polarizers on either side of a heated vapor cell that is mounted inside a solenoid. For active imaging applications, the Faraday filter may be located in the optical train preceding a charge coupled device (CCD) camera. The incorporation of a Faraday filter in an active imaging system allows the use of either a CW or a pulsed illumination laser. The filter passband can be tuned by electronic control of the magnetic field.

DETAILED DESCRIPTION OF THE INVENTION

Figure 2:
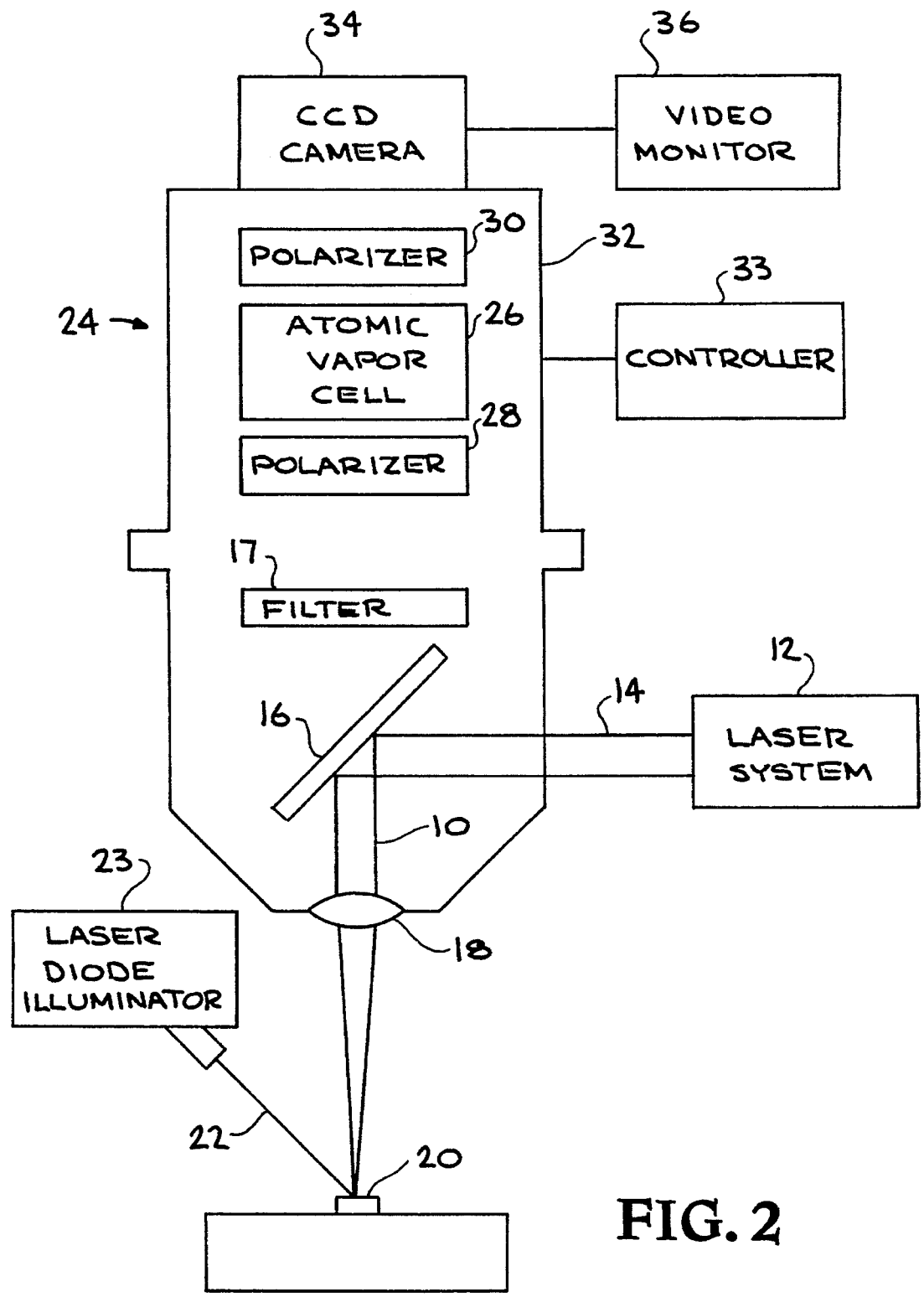
FIG. 2 shows a Faraday optical filter used in a system to image a workpiece heated by a laser welder.
Figure 3:
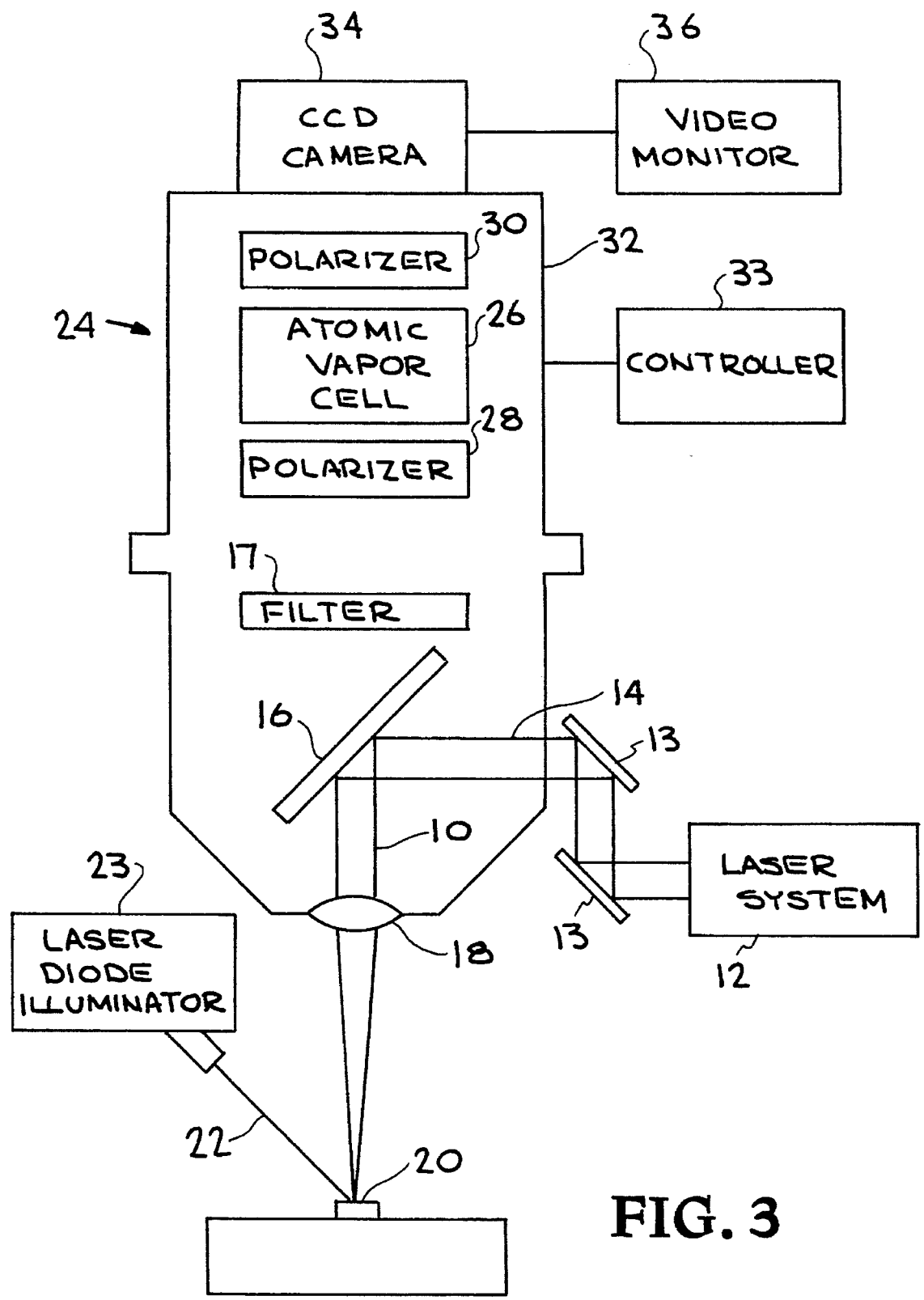
FIG. 3 shows the system of FIG. 2 having a set of articulated mirrors.

This invention is an optical viewing system comprising a laser diode illuminator and a Faraday optical filter which can be used to view with good contrast, objects and areas within a high temperature environment such as blast furnace or an area being welded using a processing laser. Referring to FIG. 2, a processing laser beam 10, produced by a high power processing laser system 12, is transmitted through a fiber optic 14 (or articulated mirrors 13 in FIG. 3). Processing laser beam 10 can be produced by a 1 kilowatt Nd:YAG laser, in which case it will have a wavelength of 1.06 microns. Turning mirror 16 directs high power laser beam 10 through focusing lens 18 to a processing area where workpiece 20 is positioned. A laser beam 22, from low power laser diode illuminator 23, illuminates workpiece 20. Laser beam 10 and laser beam 22 must necessarily be different wavelengths. Focussing lens 18 may have an antireflection coating at the wavelength of either laser beam 22 or laser beam 10. Laser beam 22 is reflected from workpiece 20 through focusing lens 18 and turning mirror 16, and may be transmitted through a bandpass dielectric prefilter 17 (typically having a 100 nanometer wavelength bandpass). Turning mirror 16 may have a dielectric coating for reflection of processing laser beam 10 and for transmission of laser beam 22.

Faraday filter 24 comprises an atomic vapor cell 26 located between polarizer 28 and polarizer 30. The relative polarizations of polarizers 28 and 30 are crossed or orthogonal. Electromagnet 32, shown in block form, provides a magnetic field to the atomic vapor cell 26. This magnetic field may be about 100 gauss. Controller 33 controls the heat to the vapor cell and also controls the electromagnet 32. Thus, the frequency passband of the Faraday optical filter 24 is tunable by electronic control of the solenoid. Illuminating laser beam 22 is transmitted through Faraday filter 24 to a non-intensified CCD camera 34 (sometimes having a lens) shown in block form, and is viewed on video monitor 36. High power laser beam 10 and the light generated at the high temperature area of workpiece 20 are not transmitted by Faraday filter 24. The entire optical viewing system is sufficiently compact that it can be mounted on the apparatus holding focusing lens 18 and can easily move with the delivery system during the welding process. With this setup, the area heated by the processing laser can be viewed with sufficiently good contrast to allow adjustment of focal length of the focusing lens 18, and/or the input laser beam 10 power, to optimize the performance of the process.

In the optical spectrum, viewing of objects is accomplished because they either emit or reflect (or both) radiation which is subsequently detected by an imaging system (for example a human eye, a CCD video camera, etc.). The radiant power emitted by an object or a background is given by $P=\epsilon\sigma T^4$ where $\epsilon$ is the emissivity of the object, $\sigma$ is the Stefan Boltzmann constant ($\sigma=5.67\times10^{-8}$ W/(m$^2$ K$^4$)) and T is the absolute temperature in degrees Kelvin. With objects at high temperature, the radiant power can easily be the dominant light source. Additionally, because the emissivities of many materials are very nearly the same ($\epsilon$ only varies between 0 and 1) and because objects in a high temperature environment often attain nearly the same temperatures, the radiant power from the objects is nearly the same. Consequently, it is very difficult to distinguish objects in the presence of the intense radiant background, i.e., they have very little contrast.

The power spectrum of the radiated power per square meter per nanometer of bandwidth from an object at temperature T is given by Planck's radiation formula $$P_\lambda \frac{\epsilon 2\pi 10^{-9} hc^2}{\lambda^5 (\exp(hc/\lambda kT) - 1)}$$

where $\epsilon$ is the emissivity, k is Boltzmann's constant, $\lambda$ is the wavelength in meters, h is Planck's constant, c is the speed of light and T is the absolute temperature. It can be clearly seen that at a given temperature, the spectrum of an object and the background will be identical (to within the emissivity factor of $\epsilon$). Thus, simply using a filter, even a very narrow band one, will not solve the contrast problem of seeing the object in the intense background.

Figure 1:
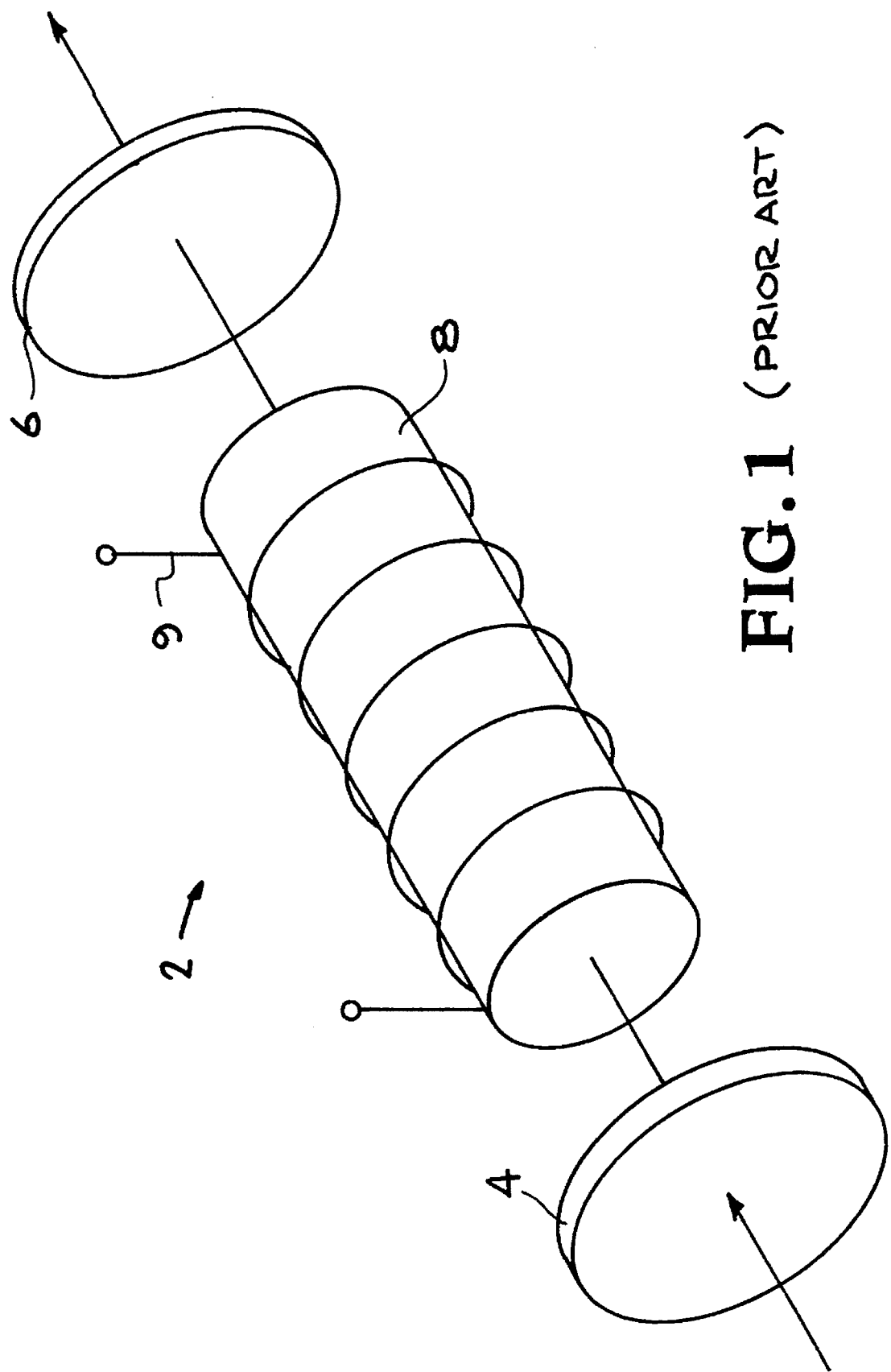
FIG. 1 shows a prior art Faraday optical filter.

In the invention, a Faraday filter is used in conjunction with a laser diode illuminator and a detector such as a CCD camera. If the CCD camera is gated, the gate should be sychronized with the diode illumination beam 22. The Faraday filter is similar to the prior art Faraday filter of FIG. 1. The filter with narrow transmission, or only about 0.007 nm, is used to block the thermally radiated power from both the object and background, but it passes the laser light reflected from both the object and the background. (For very high temperature scenes, a shorter wavelength transition at 455 nm will operate in a region of lower thermal radiance and provide increased discrimination of thermal radiation). The Faraday filter may have a center wavelength anywhere in the near infrared to the ultraviolet, and more specifically, it may have a center wavelength at either 455 nanometers or 852 nanometers. In this invention it is recognized that an entire scene can be illuminated and viewed with high contrast while blocking out the unwanted, low contrast thermal radiation.

The high contrast in the image for the reflected light (laser light or otherwise) results from significant differences in the value and character of reflected light. This is the mechanism by which standard viewing (even single color) is accomplished. Objects are distinguishable from each other and from backgrounds because they have differences in reflectivity. These differences include the net value of the reflectivity, angle of reflection caused by the shape of the surfaces and the direction of the incident light, and the reflective character of the surface, such as diffuse or specular reflections. Additionally shadows are projected in an illuminated scene which add to the contrast and depth of field. Thus, with the current invention the low contrast thermal radiation is almost entirely blocked and the high contrast reflected laser light produces a high contrast image of both the object and the background. The Faraday filter with diode laser illuminator concept is compact, simple and provides very high quality imaging and has a bandpass of 0.007 nm.

As an example, the relative power density transmitted through the Faraday filter from a radiating surface at 2000K can be computed. The result can be compared to the relative power density transmitted through the Faraday filter from an illuminator diode laser with 50 mW of average power output at 852 nm. From the equation for the power spectrum radiated by the surface, $10^{-4}$ W/cm$^2$ is computed to be transmitted through the Faraday filter bandpass of 0.007 nm. Assuming the diode laser is spread over an area of 5 cm by 5 cm, that 20% of the light is reflected in the filter direction and that the filter passes 70% of the diode light, $3\times10^{-4}$ W/cm$^2$ is computed. Thus the light flux through the filter from the diode laser will be more intense than the high temperature radiated light, and will allow clear viewing of an object otherwise dominated by the intense radiated thermal power. For sources that are even hotter, shorter wavelength illuminators will provide even more discrimination due to the $\lambda^5$ and exponential dependence of radiated power as a function of wavelength. For 455 nm versus 852 nm this amounts to a factor of more than $10^4$ at 2000K.

Changes and modifications in the specifically described embodiments can be carried out without departing from the scope of the invention, which is intended to be limited by the scope of the appended claims.

We claim:

1. A laser viewing system, comprising:

means for producing a processing laser beam having a first wavelength;

a turning mirror for reflecting said processing laser beam to produce a reflected beam;

means for delivering said processing laser beam to said turning mirror;

a focusing lens optically positioned to focus said reflected beam onto a high temperature workpiece;

a laser illuminator for producing a low power illumination laser beam, having a second wavelength, for illuminating said workpiece and desired viewing areas, wherein said illumination laser beam reflects from said workpiece and said desired viewing areas and is transmitted through said focusing lens and said turning mirror to produce a transmitted laser beam;

a Faraday optical filter optically positioned to transmit said transmitted laser beam to produce a filtered beam, wherein said Faraday optical filter does not transmit background light from said workpiece and said desired viewing areas;

a non-intensified charge coupled device (CCD) camera optically positioned to receive said filtered beam to produce an image; and means for displaying said image.

2. The laser viewing system of claim 1, wherein said means for producing a processing laser beam comprise an Nd:YAG laser.

3. The laser viewing system of claim 2, wherein said Nd:YAG laser is capable of producing at least 1 kilowatt of laser power.

4. The laser viewing system of claim 1, wherein said turning mirror comprises a dielectric coating for reflection of said processing laser beam and transmission of said low power laser beam.

5. The laser viewing system of claim 4, wherein said dielectric coating reflects light having a wavelength of 1.06 micrometers.

6. The laser viewing system of claim 1, wherein said delivering means comprise a fiber optic cable.

7. The laser viewing system of claim 1, wherein said delivering means comprise a set of articulated mirrors.

8. The laser viewing system of claim 1, wherein said focusing lens comprises an antireflection coating at the wavelength of said processing laser beam.

9. The laser viewing system of claim 1, wherein said focusing lens comprises an antireflection coating at the wavelength of said low power laser beam.

10. The laser viewing system of claim 1, wherein said laser illuminator comprises a laser diode.

11. The laser viewing system of claim 1, wherein said Faraday optical filter comprises:

a first polarizer and a second polarizer, wherein said first polarizer has a polarization transmission direction that is orthogonal to a polarization transmission direction of said second polarizer;

a solenoid; and a heated vapor cell mounted within said solenoid, wherein said heated vapor cell is positioned between said first polarizer and said second polarizer.

12. The laser viewing system of claim 1, wherein said non-intensified CCD camera further comprises a lens to focus said filtered beam onto said non-intensified CCD camera.

13. The laser viewing system of claim 1, wherein said displaying means comprise a video monitor.

14. The laser viewing system of claim 11, wherein said Faraday optical filter has a center wavelength in the near infrared to the ultraviolet.

15. The laser viewing system of claim 11, wherein said Faraday optical filter has a center wavelength at about 852 nanometers.

16. The laser viewing system of claim 11, wherein said Faraday optical filter has a center wavelength at about 455 nanometers.

17. The laser viewing system of claim 10, wherein said laser diode produces light at about 852 nanometers.

18. The laser viewing system of claim 10, wherein said laser diode produces light at about 455 nanometers.

19. The laser viewing system of claim 11, wherein said solenoid produces an axial magnetic field of about 100 gauss.

20. The laser viewing system of claim 11, wherein said heated vapor cell comprises cesium.

21. The laser viewing system of claim 11, wherein said Faraday filter comprises a frequency passband that is tunable by electronic control of said solenoid.

22. The laser viewing system of claim 11, wherein said heated vapor cell is heated to about 120 degrees C.

23. The laser viewing system of claim 1, wherein said CCD camera comprises a gated sensor synchronized with said low power laser beam.

24. The laser viewing system of claim 1, further comprising a bandpass dielectric prefilter placed between said focusing lens and said Faraday filter.

25. The laser viewing system of claim 24, wherein said bandpass dielectric prefilter comprises a 100 nanometer wavelength bandpass.

26. A method for Faraday imaging at high temperatures, comprising:

producing a processing laser beam having a first wavelength;

reflecting said processing laser beam to produce a reflected beam;

focusing said reflected beam onto a workpiece;

illuminating said workpiece with a low power illumination laser beam, having a second wavelength, to produce a reflected illumination beam;

transmitting said reflected illumination laser beam through a Faraday optical filter, wherein said Faraday optical filter does not transmit background light, wherein said Faraday optical filter does not transmit said processing laser beam;

detecting said reflected illumination laser beam after it is transmitted through said Faraday optical filter to produce an image; and displaying said image.

27. A system for imaging a high temperature object, comprising:

a low power laser illuminator for producing an illumination laser beam for illuminating said high temperature object and a desired viewing area, wherein said illumination laser beam reflects from said high temperature object and said desired viewing area to produce a reflected beam;

a Faraday optical filter optically positioned to transmit said reflected illumination laser beam to produce a filtered beam, wherein said Faraday optical filter does not transmit background light from said high temperature object and said desired viewing area;

a non-intensified charge coupled device (CCD) camera optically positioned to receive said filtered beam to produce an image; and means for displaying said image.

* * * * *